No. 740,694. PATENTED OCT. 6, 1903.
V. ROYLE.
MACHINE FOR CUTTING JACQUARD CARDS.
APPLICATION FILED OCT. 9, 1901.
NO MODEL. 8 SHEETS—SHEET 1.
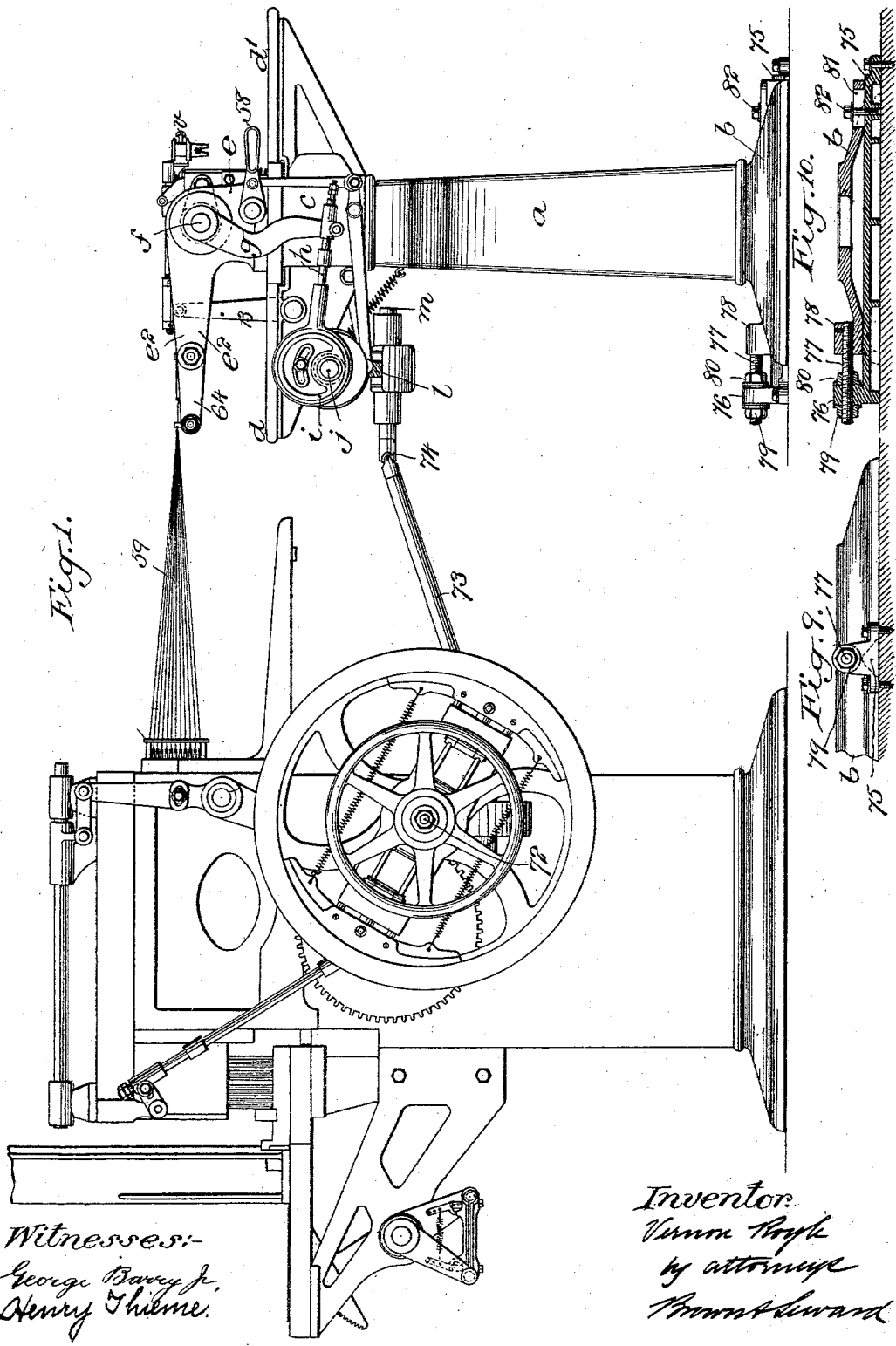

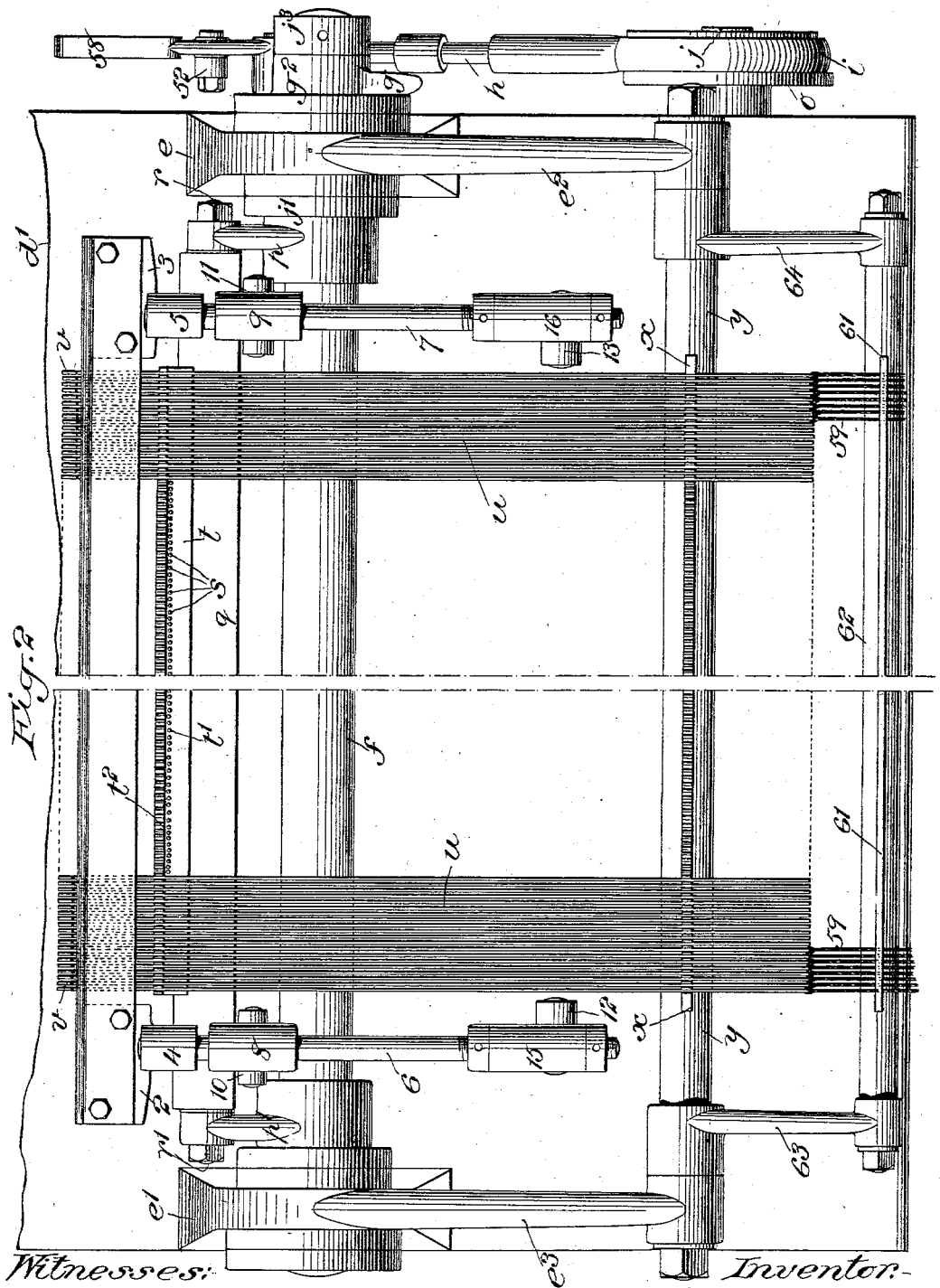

No. 740,694. PATENTED OCT. 6, 1903.
V. ROYLE.
MACHINE FOR CUTTING JACQUARD CARDS.
APPLICATION FILED OCT. 9, 1901.
NO MODEL. 8 SHEETS—SHEET 3.
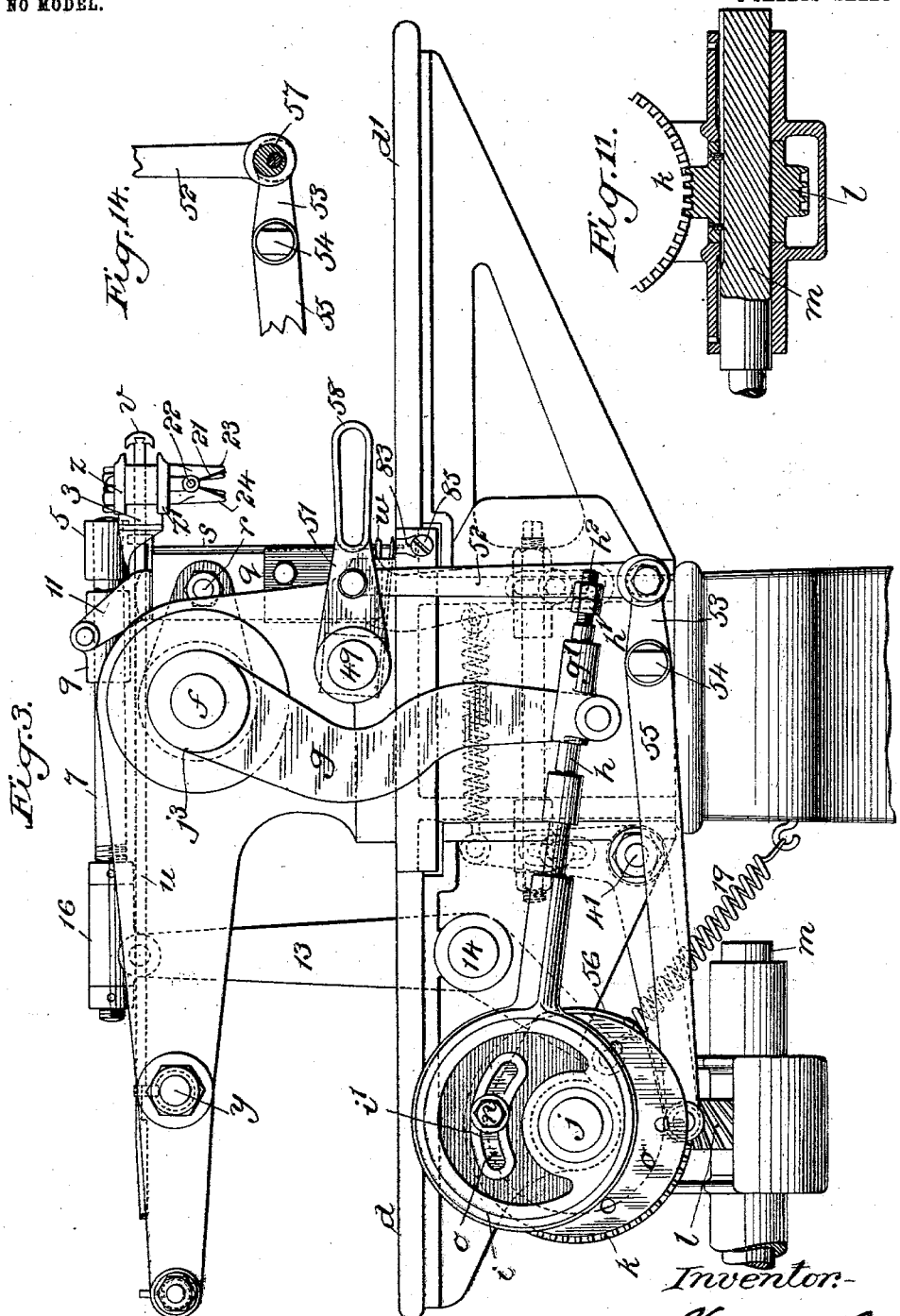
Witnesses:
George Barry Jr
Henry Thieme
Inventor:
Vernon Royle
by attorneys
Brown & Seward

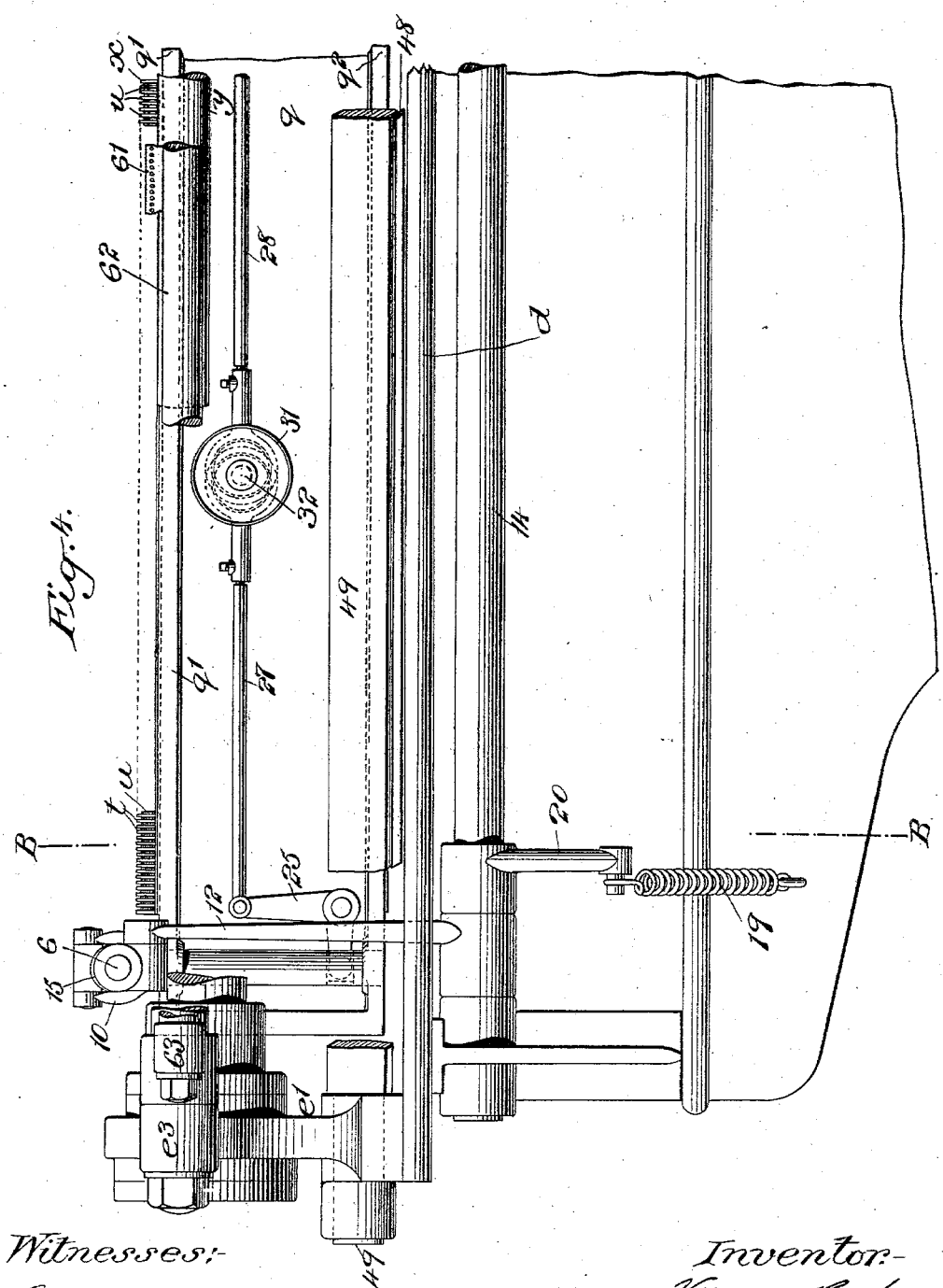

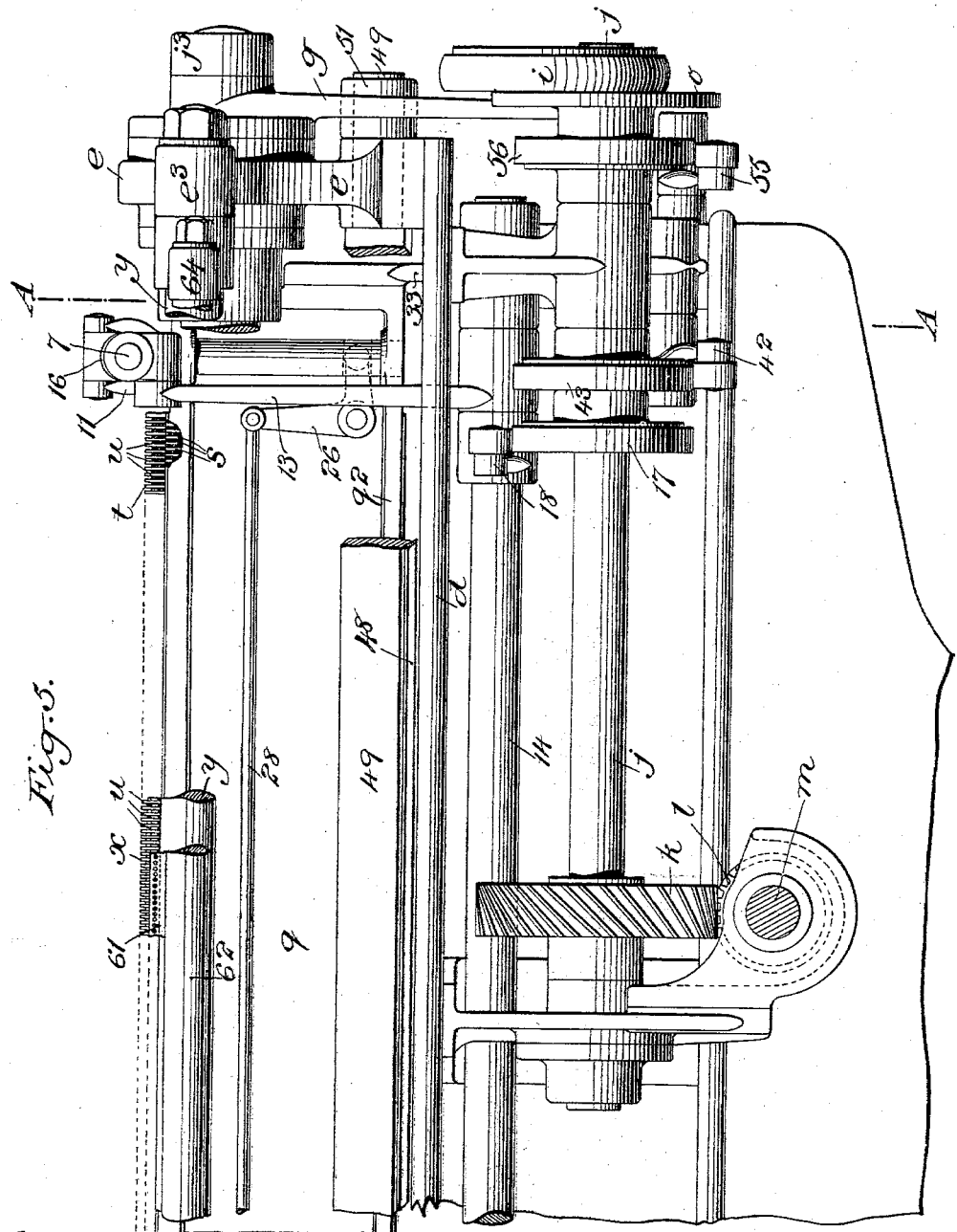

No. 740,694. PATENTED OCT. 6, 1903.
V. ROYLE.
MACHINE FOR CUTTING JACQUARD CARDS.
APPLICATION FILED OCT. 9, 1901.
NO MODEL. 8 SHEETS—SHEET 6.
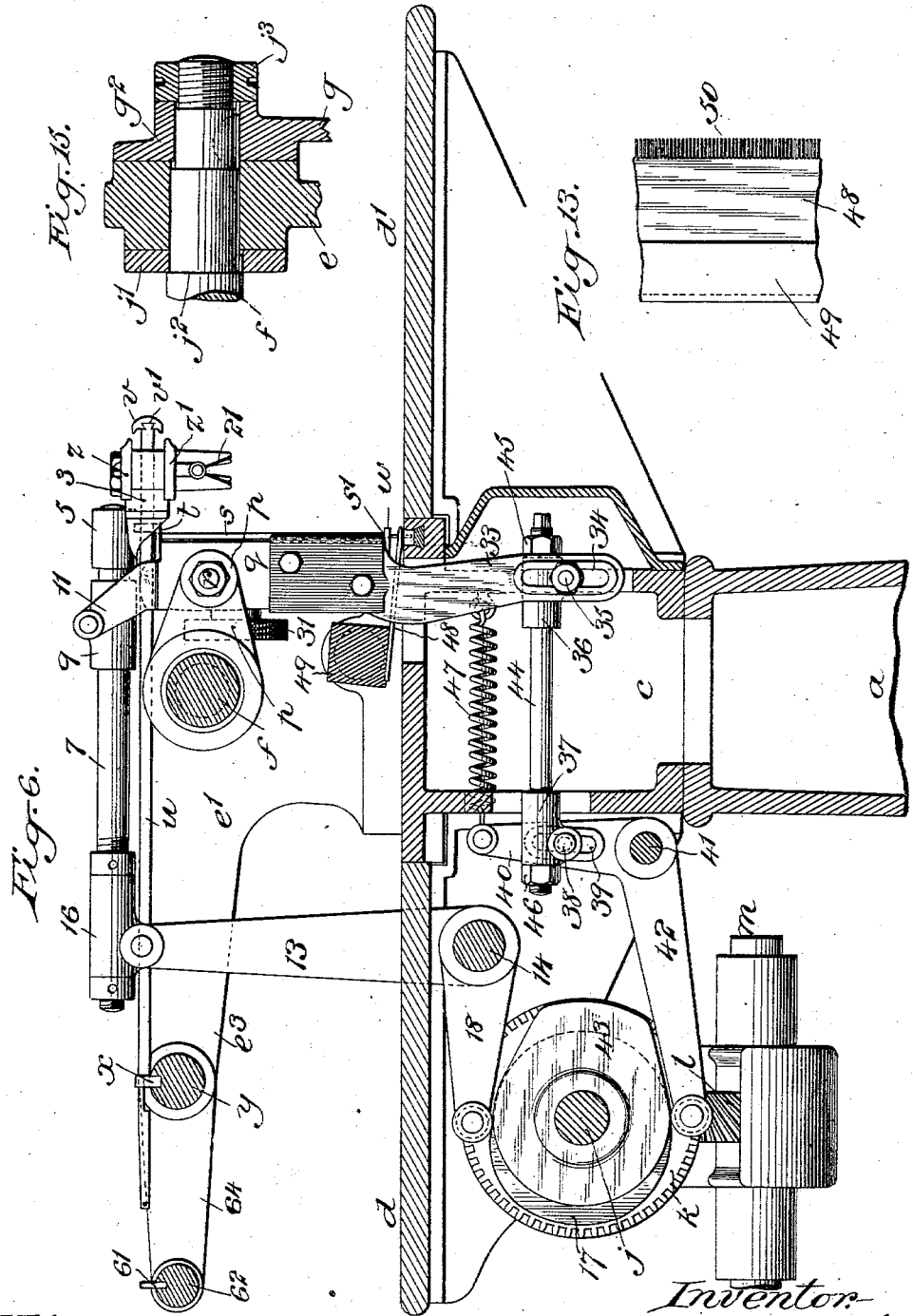

No. 740,694. PATENTED OCT. 6, 1903.
V. ROYLE.
MACHINE FOR CUTTING JACQUARD CARDS.
APPLICATION FILED OCT. 9, 1901.
NO MODEL. 8 SHEETS—SHEET 7.
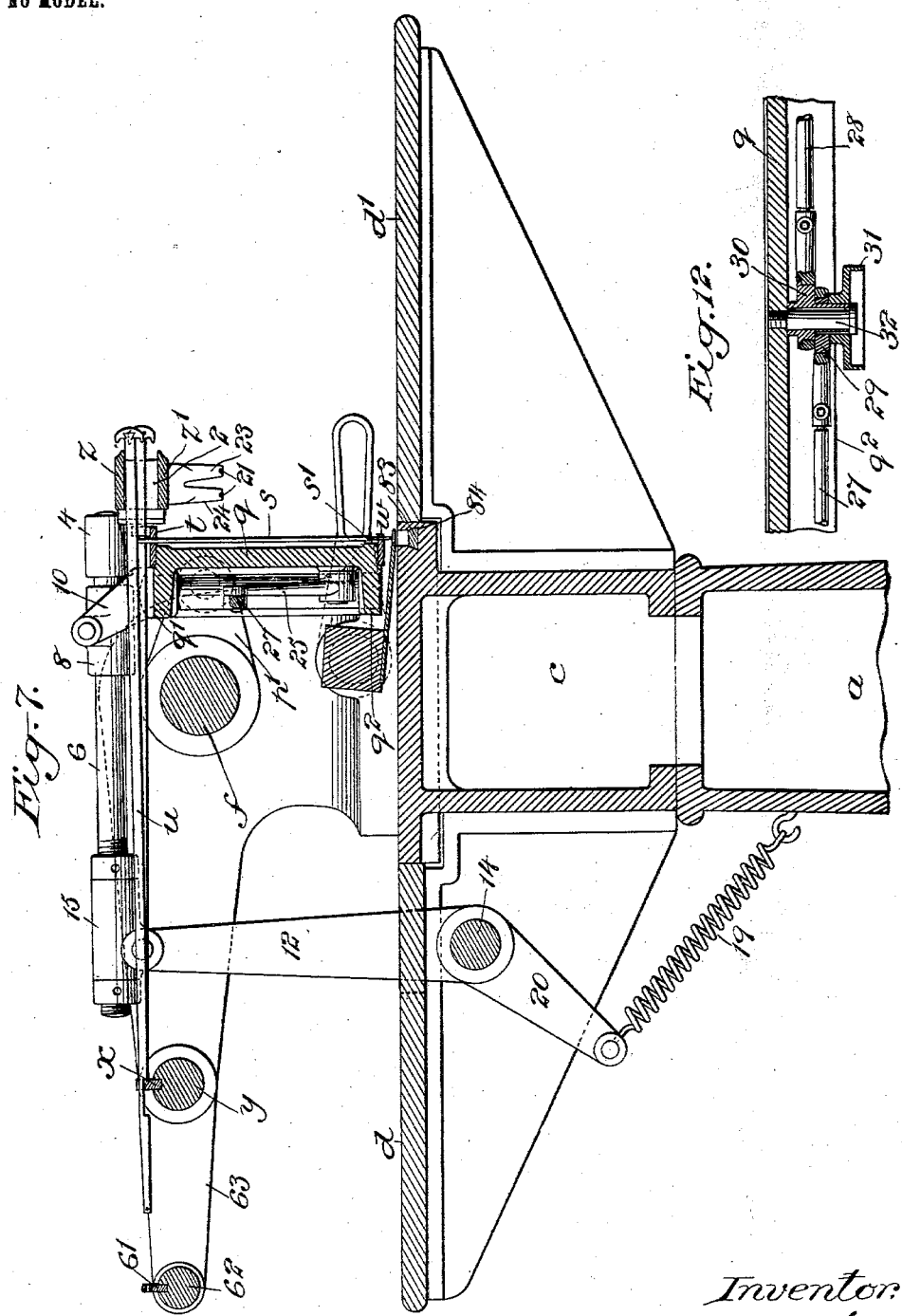

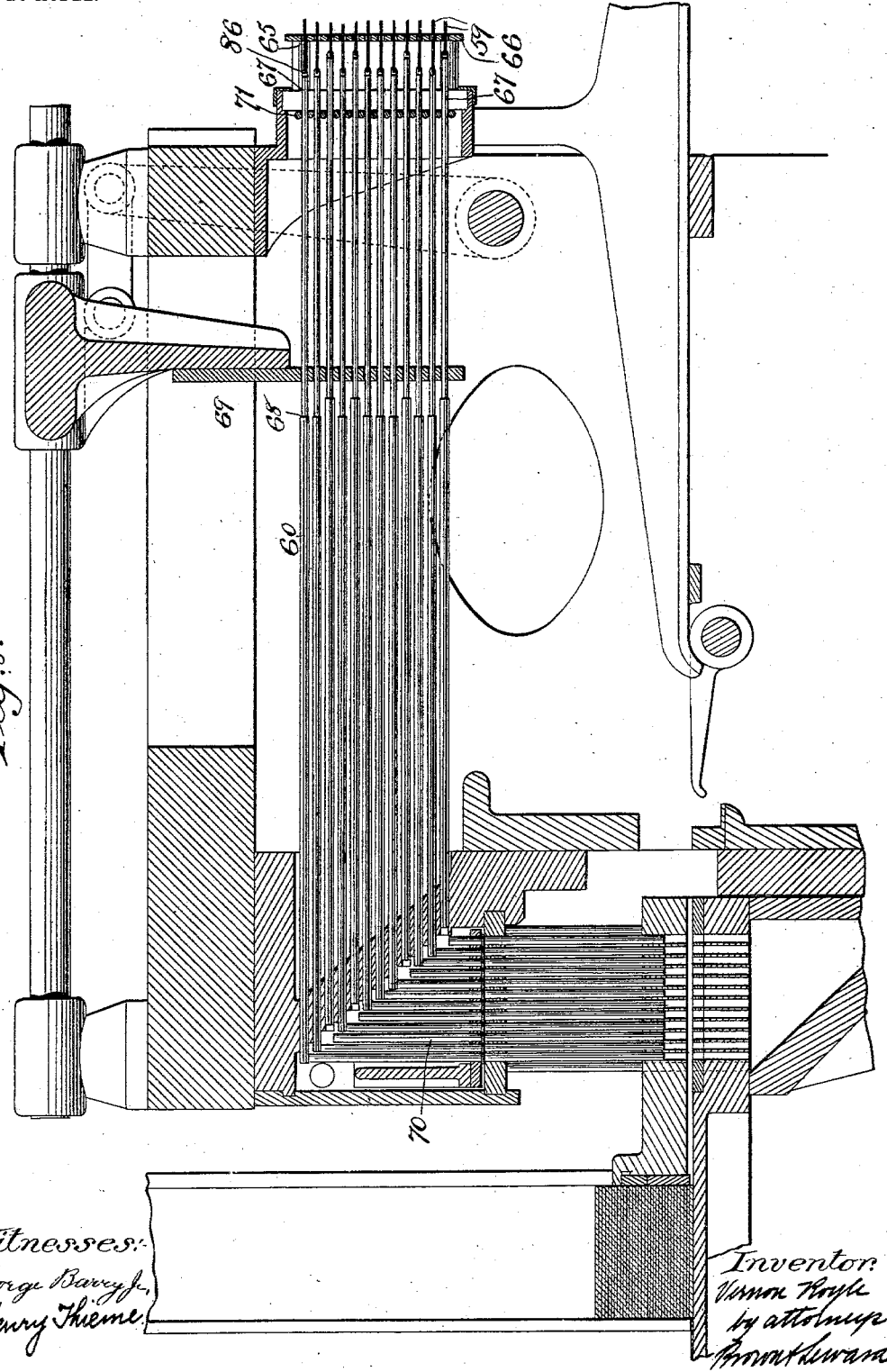

No. 740,694. Patented October 6, 1903.

UNITED STATES PATENT OFFICE.

VERNON ROYLE, OF PATERSON, NEW JERSEY.

MACHINE FOR CUTTING JACQUARD-CARDS.

SPECIFICATION forming part of Letters Patent No. 740,694, dated October 6, 1903.

Application filed October 9, 1901. Serial No. 78,098. (No model.)

*To all whom it may concern:*

Be it known that I, VERNON ROYLE, a citizen of the United States, and a resident of Paterson, in the county of Passaic and State of New Jersey, have invented a new and useful Machine for Cutting Jacquard-Cards, of which the following is a specification.

My invention relates to a machine for cutting jacquard-cards, and more particularly to a machine for mechanically transferring a pattern to a series of jacquard-cards for the purpose of reproducing the pattern in the woven goods produced by a loom under the control of said series of cards.

A practical embodiment of my invention is represented in the accompanying drawings, in which—

Figure 1 is a view of the machine in side elevation. Fig. 2 is an enlarged top plan view of the selecting mechanism. Fig. 3 is a view of the same in side elevation. Fig. 4 is a partial view of the same in rear elevation, partly in section, showing the machine from one side to a point near the center. Fig. 5 is a similar view showing the machine from the opposite side to a point near the center, the two Figs. 4 and 5 being substantial complements of each other to show a view of the selecting mechanism complete in rear elevation. Fig. 6 is a vertical section of the same from front to rear in the plane of the line A A of Fig. 5. Fig. 7 is a similar view in the plane of the line B B of Fig. 4. Fig. 8 is an enlarged section from front to rear through the punching mechanism. Fig. 9 is a view in detail, showing the base of the pedestal in rear elevation together with the means for adjusting it and the pedestal thereon toward and away from the punching mechanism. Fig. 10 is a vertical section from front to rear through the said base. Fig. 11 is a view in detail, partly in section, of the drive connection between the punching and selecting mechanisms. Fig. 12 is a sectional view in detail, showing the means for simultaneously adjusting the selecting-hook-operating mechanism to produce either the positive or negative of the pattern. Fig. 13 is an enlarged view in detail tail of a portion of the stripper-bar. Fig. 14 is a sectional view in detail, showing the eccentric bushing for adjusting the throw of the stripper; and Fig. 15 is a view in detail, showing the friction device for controlling the needle-bar support.

The pattern which I at present find it feasible to employ consists of a perforated sheet of material—such, for example, as cardboard—in which the series of perforations extend in parallel rows across the sheet, the design of the pattern being formed by filling these perforations corresponding to the shape and extent of the design, leaving the remaining perforations open. This sheet so prepared is mechanically fed step by step corresponding to the distance between two successive rows of perforations beneath a bank of selecting-needles. As the bank of needles is lowered into the plane of the pattern-sheet such needles as fall opposite the perforations in the pattern will pass through these perforations, while those which fall opposite the filled perforations in the pattern will remain in a more elevated position. While the needles are so adjusted, either those which are depressed or those which are elevated, depending upon whether the pattern itself or the reverse of the pattern is to be transferred to the cards, will arrest certain of a gang of reciprocating hooks, and thereby transmit to the punch-keys such action as will cause them to lock or release the punches, as may be, to produce the cutting of the card according to the positive or negative of the pattern. The punching operation is timed with respect to the selecting and locking of the punches, and, in fact, the two work in intimate relation through a drive connection leading from the actuating part of the punching mechanism to the operating parts of the selecting mechanism.

The means for producing the several operations and results above briefly stated may be specifically described as follows: The support for the working parts of the selecting mechanism consists of a pedestal *a*, uprising from the base *b* and surmounted by a head *c*, having brackets or wings *d d'* extending to the front and rear of the head *c*. The brackets or wings *d d'* serve, together with the top of the head *c*, as a continuous table, along which the pattern-cards are fed, and they further serve as supports for certain of the operating parts, as will be hereinafter more particularly described. At the opposite ends of the head $c$ and extending upwardly therefrom are standards $e$ $e'$, having rearwardly-projecting arms $e^2$ $e^3$. (See Figs. 1 and 2.) A rock-shaft $f$ is journaled in the standards $e$ $e'$ and is operated by means of an arm $g$, connected by a rod $h$ with an eccentric $i$, fixed on a shaft $j$, to which a rotary motion is imparted by means of a worm-wheel $k$, fixed on the shaft $j$ and in mesh with a worm $l$ on the drive-shaft $m$. The worm $l$ has a feather-and-groove connection with the shaft $m$, as clearly shown in Fig. 11, whereby the shaft $m$ is permitted a limited longitudinal sliding movement within the worm $l$, while at the same time the worm $l$ is driven positively by the rotary movement of the shaft $m$ whatever the longitudinal position of the shaft $m$ within the worm may be. This longitudinal movement of the shaft $m$ serves a function which will be hereinafter more particularly referred to. The connection of the arm $g$ with the rod $h$ is made by means of a socket-piece $g'$ free to slide on the rod $h$ to a limited extent to be determined by the nut $h'$ and its set-nut $h^2$. This is for the purpose of giving the arm $g$, and hence the rock-shaft $f$, a delay at the limit of its rocking movement. The amount of throw of the arm $g$, and hence the extent of the rocking movement of the shaft $f$, is determined very accurately by means of the position of the eccentric $i$ on the shaft $j$, such position being determined by means of a set-screw $n$ passing through a curved slot $i'$ in the eccentric into a plate or disk $o$, fixed on the shaft $j$. The rock-shaft $f$ is held against movement during the delay period and while the sliding of the rod $h$ through the socket-piece $g'$ by means of the friction-grip is exerted by the washer $j'$ and the head $g^2$ of the arm $g$, which acts as a washer, the said washer $j'$ and head $g^2$ having a frictional engagement with the opposite faces of the fixed bearing in the standard $e$. The said washer $j'$ and head $g^2$ are keyed to rotate with the shaft $f$, but are permitted a limited sliding movement on the shaft and are clamped against the opposite faces of the bearing in the standard by means of a shoulder $j^2$ on the shaft $j$ and a nut $j^3$, screwed onto the outer end of the shaft and bearing against the washer or head $g^2$ of the rocking arm $g$. The rock-shaft $f$ has fixed thereon a pair of short supporting-arms $p$ $p'$, which carry at their free ends the needle-bar $q$. The bar $q$ is connected to the arms $p$ $p'$ by means of trunnions $r$ $r'$, which will permit the needle-bar $q$ to vibrate on its support while being bodily raised and lowered by the arms $p$ $p'$ under the action of the rock-shaft $f$.

Particular attention is called to the relation between the needle-bar $q$ and the selecting-needles $s$, carried thereby. The needles $s$ are raised in a line along the face of the bar and have such an extended bearing with the bar that they will be moved bodily with the bar in a direction transverse to the longitudinal movement, while at the same time they are permitted a limited longitudinal movement relative to the bar. In the present instance I have furnished bearings for the needles near their upper ends and also near their lower ends, these bearings forming a part of the needle-bar as a whole and of a plate $t$, fixed to the top of the bar $q$ and projecting a little in front of the bar, where it is provided with numerous perforations $t'$, (see Fig. 2,) through which the heads of the needles slide, the said upper front edge of the plate $t$ being serrated, as shown at $t^2$, to receive the shanks $u$ of the hooks $v$, which operate the punch-controlling keys. A second bearing-plate $w$ is secured to the bottom of the needle-bar $q$ and, like the plate $t$, is provided with a line of perforations for receiving the points of the needles, the needles themselves being shouldered a short distance back from their points, as at $s'$, to rest upon the plate or bearing $w$ and form a stop for the downward movement of the needles holding in position so far as their downward movement is concerned relative to the bar, but leaving them free to slide upwardly in their bearings $t$ and $w$ when their points engage the filling in the holes of the pattern during the downward movement of the needle-bar $q$. The shanks $u$ of the hooks $v$ rest immediately above the heads of the needles $s$, one shank for each needle, and the hooks $v$ are each double, their points extending both above and below the shank $u$, as clearly shown in Figs. 3, 6, and 7. They rest, as before stated, near their forward ends between the teeth of the serrated bar $t^2$ on the bearing $t$, and near their rear ends they rest in a serrated bar $x$, set in the top of a bar $y$, supported in the rear ends of the arms $e^2$ $e^3$ of the standards $e$ $e'$. The hooks are permitted a longitudinal sliding movement in their bearings, and they are operated by means of what I am pleased to term "knives," two in number, (denoted by $z$ $z'$,) one above the series of hooks and the other below the series of hooks, held spaced apart by means of spacing-blocks 2 and 3, to the upper and lower faces of which they are fastened near their ends. The blocks 2 and 3 are provided with socket-pieces 4 and 5 for securing therein the forward ends of operating-rods 6 and 7, having a longitudinally-sliding movement in bearings 8 and 9 supported in bifurcated standards 10 11, carried by and projecting upwardly and slightly rearwardly from the needle-bar $q$. The bearings 8 and 9 are pivoted between the branches of the bifurcated standards 10 and 11, so that the bearings will adjust themselves to the positions of the rods 6 and 7 as they are operated by means of arms 12 and 13, fixed to rock with the shaft 14 and pivotally connected at their upper ends with the sleeves 15 16, secured to the rear ends of the operating-rod 6 and 7. The rock-shaft 14 is rocked in one direction by means of a cam 17 on the drive-shaft $j$, which cam engages the free end of an arm 18, projecting rearwardly from the shaft, and the said shaft is returned in the opposite direction by means of a spring 19, secured at one end to the pedestal and at its opposite end to an arm 20, fixed to and projecting downwardly and rearwardly from the shaft 14.

The knives $z\ z'$ and their supporting end blocks are made as light as consistent with necessary strength, and to overcome any tendency to sag out of alinement I find it desirable to truss them by means of a wire 21 passing from the end 22 over a standard 23 and thence to the opposite end and return, passing over the end of a standard 24. This provides a light and strong arrangement for holding the knives in a right line. The space between the knives is such that when they are lowered into the position shown in Fig. 7 the upper knife $z$ will engage such hooks as have been raised, while those which have not been raised will not be operated, and when the said knives are raised into their uppermost position then those hooks which have been raised will escape contact with the knives and those which have not been raised will be engaged by the lowermost knife $z'$.

The operation of setting the knives to engage either the hooks which have been raised or the hooks which have not been raised to produce the negative or positive of the pattern is performed by the operator.

The bifurcated standards 10 and 11 have a limited vertically-sliding movement in their bearings at the top and bottom of the needle-bar $q$, the body of the said bar being of the channel type, having flanges $q'\ q^2$, and it is in these flanges that the standards 10 and 11 have their vertically-sliding movement to raise and lower the knives $z\ z'$. These standards are simultaneously operated either to elevate or depress the knives by means of angle-levers 25 26, (see Figs. 4 and 5,) pivotally secured to the back of the needle-bar $q$, having one arm of each lever engaged with the standard and their opposite arms connected by rods 27 28 with eccentric 30, (see Fig. 12,) fixed to turn with a hand-wheel 31 on a stub-axle 32, set in the back of the needle-bar $q$. By turning the wheel 31 the rods 27 and 28 will be simultaneously operated in opposite directions, causing the standards 10 and 11 to be simultaneously lifted or depressed, as the case may be.

The hooks $v$, with which the knives engage, are preferably made independent of their shanks $u$ and are connected with the ends of the shanks by means of a dovetailed cut (shown at $v'$, Fig. 6) and then brazed to prevent them from separating. The longitudinal strain upon the hook will thus be taken by the slanting wall of the dovetailed cut, and the formation of the hook and its shank in separate pieces admits of making the hooks themselves of a fine quality of metal—for example, tool-steel—which will withstand wear for a great length of time, while the shanks, requiring by far the greater amount of metal, may be made of a cheaper quality, thus materially reducing the cost of the hooks without impairing their durability and effectiveness.

The vertically-reciprocating bodily movement of the needle-bar with the needles thereon to lower the needles into contact with the pattern and lift them out of contact therewith is accomplished, as has hereinbefore been explained, by the action of the rock-shaft $f$.

The forwardly and rearwardly vibrating movement of the needle-bar as a whole on its supports in the arms $p\ p'$ is effected by means of a depending arm 33, fixed to the needle-bar, as clearly shown in Fig. 6, and provided with an elongated slot 34 for receiving the bolt or screw 35 on the connecting-sleeve 36. The screw 35 is provided with a suitable nut for clamping the sleeve 36 to the arm 33 at any position desired within the limits of the slot 34. A similar connecting-sleeve 37 has its screw or bolt 38 projecting through an elongated slot 39 in the arm 40 of a bell-crank lever, pivotally secured on a bearing 41, and its arm 42 extending rearwardly in position to engage a cam 43, carried by the drive-shaft $j$. The connecting-sleeves 36 37 are arranged to receive a connecting-rod 44, provided at its opposite ends with adjusting-nuts 45 46 for the purpose of increasing or diminishing the throw of the arm 33, and hence the extent of feed movement of the needle-bar. The arm 40 of the bell-crank lever is held normally drawn toward the front by means of a spring 47, connected at one end with the arm and at the opposite end with the head $c$ on the pedestal.

The above arrangement provides an adjustment of the feed movement of the needles to a very great degree of accuracy, and this is a very important feature of the machine, for it is essential that the pattern-card be fed to a hair's breadth at each step in order that the selecting-needles may readily enter the numerous small perforations wherever they are left open for that purpose.

It is furthermore important that the machine should be adapted to use with pattern-cards having their lines of perforations at various distances apart in order to give the machine a universal character. In the present instance the throw of the points of the needles may be varied, in the first instance by the adjustment of the length of the connecting-rod 44 by means of its nuts 45 46; in the second instance by raising and lowering the forward end of the rod 44, together with its sleeve 36, along the elongated slot 34, while the sleeve 37 remains in its adjustment; in the third place by varying the position of the sleeve 37 with respect to the slot 39, while the sleeve 36 retains its position; and, fourthly, by the simultaneous adjustment of the sleeves 36 and 37 along the slots 34 39.

To insure the removal of the points of the needles from the holes in the pattern-card at the end of the feed movement, I provide a stripper. This consists of a thin plate of metal 48, (see Figs. 6 and 13,) secured to the bottom of a polygonal bar 49 and projecting forwardly to the position where the needles engage the pattern-card. This stripper-plate 48 may be provided with teeth 50 to project alternately between the successive needles, or the teeth may be omitted and its front edge raised in position in proximity to the position which the points of the needles assume at the limit of their feed movement. The bar 49 is mounted to rock to raise and lower the free edge of the stripper-plate, and this motion is imparted to it by means of a forwardly-projecting arm 51 (see Fig. 3) on the end of the bar 49, the said arm 51 being connected by a link 52 with the short arm 53 of a vibrating lever fulcrumed at 54 on the head $c$ of the support, the long arm 55 of said vibrating lever being in position to engage a cam 56, fixed on the drive-shaft $j$. The connection between the link 52 and arm 53 of the lever is made by an eccentric bushing 57, (see Fig. 14,) which by being turned and fixed in its different positions on the pivotal connection will serve to adjust the position of the vertical movements of the stripper as well as to slightly vary the extent of its movement. The arm 51 is conveniently provided with a handle 58 to be operated by hand in case any one or more of the needles should in any instance hold fast in the perforation in the pattern.

Each of the shanks $u$ of the hooks is connected by cord or wire, in the present instance a cord 59, with a punch-locking key 60 of the card cutting or punching section of the machine. The several cords 59 pass through perforations formed in a guide-strip 61, fixed in the top of a bar 62, held in the rearwardly-projecting arm 63 64, secured on the shaft or bar $y$. From the guide-strip 61 the cords extend to and through perforations 65 in the guide-plate 66, supported by the frame of the punching-section of the machine in position to direct the cords in right lines to the ends of the keys 60. The keys 60 are arranged in vertical as well as horizontal banks and have their ends 67, connected with the cords 59, reduced, producing shoulders 68, by means of which the keys are positively returned at each revolution of the drive-shaft by means of the reciprocating plate 69 into locking position over the punches 70. The tips of the reduced ends 67 of the keys are provided with eyes 86, through which the flexible connections, either cords or wires 59, are passed for connecting the hooks to the keys.

A retarding device in the form of a grid, composed of horizontal bars 71 alternating with the horizontal series of keys, serves to retain the keys in such position as they may be moved either by the cords 59 or plate 69 until they are positively removed by the action of said cords or plate.

As my present invention relates to the construction and operation of the selecting-section of the machine rather than to the card-cutting or punching section, only such parts of the latter as are necessary and which intimately coact with the selecting mechanism have been introduced in detail in the present application.

In Fig. 1 the punching or card-cutting section is represented in elevation, and its drive-shaft 72, actuated from a source of power, (not shown,) imparts to the oblique shaft 73 a constant rotary motion, which is transmitted through the universal coupling 74 to the shaft $m$, which in turn actuates the main drive-shaft $j$ of the selecting-section of the machine, as has been hereinbefore fully explained.

In setting up the two sections of the machine—viz., the selecting and the cutting sections—it is important that the strain upon the cords 59 be equalized with great precision, and to this end I have mounted the base $b$ of the pedestal $a$ upon a foundation 75, on which the said base, with its pedestal and all the parts carried thereby, may be moved to a limited extent toward and away from the cutting or punching section of the machine. The foundation 75 is fixed to the floor and is provided with an upwardly-extended lug 76 on its side toward the cutting-section, through which an adjusting-screw 77 works freely, the said screw 77 being fixed in a lug 78 on the base $b$. Adjusting-nuts 79 and 80 are engaged with the screw 77 on the opposite sides of the lug 76, and by loosening the one and screwing the other the base $b$, with the pedestal and the mechanism thereon, may be bodily drawn toward and away from the lug 76 on the foundation 75 to impart to the bank of cords 59 such tension as may be desired. The base $b$ is provided on its opposite side with an elongated opening 81, through which a screw-bolt 82 extends into the foundation 75 to hold the base steadily on the foundation and at the same time permit it to move toward and away from the lugs 76 when it is desired to adjust it.

In order to permit the pedestal $a$ to be bodily adjusted toward and away from the cutting-section of the machine, the shaft $m$, hereinbefore referred to, is permitted to slide longitudinally within the worm $l$, as clearly shown in Fig. 11, where its feather-and-groove connection with the worm is clearly illustrated, thus enabling the operator to increase or diminish the tension upon the cords 59 as the changing conditions of the atmosphere may require without in any manner interfering with the operation of the shafts 73 and $m$, through which motion is imparted to the selecting mechanism from the cutting mechanism.

The operation as a whole may be briefly described as follows: The perforated pattern-card, with the pattern thereon, having been placed in position on the table $d'$ with its first line of perforations beneath the bank of selecting-needles and the machine set in operation and the knives $z\ z'$ located in position to engage those hooks which are raised by the needles, as shown in Fig. 7, when the needles *s* are lowered into engagement with the pattern-card those which fall opposite the unfilled perforations in the pattern-card will pass down between the teeth of a rack-bar 83, having a dovetailed seat 84 in the head *c* immediately beneath the bank of needles and of sufficient width to permit their swinging movement, while those needles which came opposite the filled holes in the pattern-card have been prevented from passing through the pattern-card, and hence by their engagement with the shanks *u* above them have lifted such hooks into the position shown in Fig. 7, where they will be engaged by the knife *z*. The rack 83 is made longitudinally adjustable in its dovetailed seat and is adjusted to permit the needles to center in the spaces between its teeth by means of setscrews 85, (see Fig. 3,) located at each of the opposite ends of the rack and engaged with the supporting-head *c*. As soon as the downward stroke of the needles is completed the timing is such that the knives *z z'* will be moved forwardly and will take with them in their forward movement such of the hooks *v* as have been raised, thereby withdrawing the keys 60, attached to the shanks of said hooks, from over the tops of their respective punches 70, and hence those punches will work idly, while those from which the keys have not been withdrawn will cut the card. The perforations in the card will therefore correspond to the perforations which were not filled in the pattern-card, and hence will produce the negative of the pattern on the cards. If, however, the knives *z* be lifted into position to engage those hooks which were not raised by the needles instead of those which were raised, then those keys corresponding to the needles which pass through the perforations in the pattern-card will be withdrawn from over their respective punches, and those punches which correspond to the keys the operating-hooks of which were lifted by the needles will be operated, and hence the cards will be punched to produce the positive of the pattern on the pattern-card. The timing is such that while the punching operation is taking place in the card-cutting section of the machine the selecting-needles *s* will be rocked forward by the rocking movement of the needle-bar, with which, as hereinabove described, they move bodily, and their swinging movement will advance the pattern-card sheet the distance corresponding to the distance between the central lines of two consecutive series of perforations in the pattern-card, and at this point the needles will be withdrawn from the pattern-card and the stripper-plate will have come into position to prevent the pattern-card from rising as the needles are withdrawn from it, so that it shall be held securely and accurately in position to receive the needles on their next downward movement. In this manner the reproduction of the pattern on the pattern-card or its negative will proceed until the pattern has been completed or the machine stopped.

It is obvious that changes might be resorted to in the form and arrangement of the several parts without departing from the spirit and scope of my invention. Hence I do not wish to limit myself strictly to the structure herein set forth; but

What I claim is—

1. The combination with a bank of selecting-needles arranged to engage the pattern-card, a punching mechanism and means for transmitting the action of the selecting-needles to the card-punching mechanism, of a movable stripper arranged to engage the pattern-card as the needles are withdrawn therefrom, substantially as set forth.

2. The combination with a bank of selecting-needles arranged to engage the pattern-card, a punching mechanism and means for transmitting the action of the selecting-needles to the card-punching mechanism, of a pivoted stripper arranged to engage the pattern-card as the needles are withdrawn therefrom, substantially as set forth.

3. The combination with a bank of selecting-needles arranged to engage the pattern-card, a punching mechanism and means for transmitting the action of the selecting-needles to the card-punching mechanism, of a stripper arranged to engage the pattern-card as the needles are withdrawn therefrom, the said stripper comprising a rock shaft or bar and a plate secured to and projecting from the bar, substantially as set forth.

4. The combination with a bank of selecting-needles arranged to engage the pattern-card, a punching mechanism and means for transmitting the action of the selecting-needles to the card-punching mechanism, of a stripper arranged to engage the pattern-card as the needles are withdrawn therefrom, the said stripper comprising a rock shaft or bar and a serrated plate secured to and projecting from the said bar, substantially as set forth.

5. The combination with a bank of selecting-needles arranged to engage the pattern-card, a punching mechanism and means for transmitting the action of the selecting-needles to the card-punching mechanism, of a stripper arranged to engage the pattern-card as the needles are withdrawn therefrom, and means for varying the movement of the stripper, substantially as set forth.

6. The combination with a bank of selecting-needles arranged to engage the pattern-card, a punching mechanism and means for transmitting the action of the selecting-needles to the card-punching mechanism, of a stripper arranged to engage the pattern-card as the needles are withdrawn therefrom, and an eccentric bushing for varying the movement of the stripper, substantially as set forth.

7. The combination with a needle-bar, of a bank of selecting-needles carried by the bar in a substantially upright position and means for holding the needles against lateral movement with respect to the bar, the said needles being free to move lengthwise to a limited extent up and down along the face of the bar, substantially as set forth.

8. The combination with the needle-bar, of the bank of selecting-needles arranged in substantially upright positions and means for supporting the needles on the bar near the opposite ends of the needles to prevent lateral displacement of the needles with respect to the bar, the said needles being free to move lengthwise to a limited extent up and down along the face of the bar, substantially as set forth.

9. The combination with the bank of selecting-needles arranged in substantially upright positions and provided with shoulders, of the needle-bar provided with means for supporting the needles and holding them against lateral movement with respect to the bar while permitting them to have a longitudinal movement up and down along the face of the bar, substantially as set forth.

10. The combination with a swinging needle-bar, of a bank of selecting-needles supported thereon and free to slide lengthwise to a limited extent transversely across the face of the bar, and means for operating the bar and needles, substantially as set forth.

11. The combination with the needle-bar and the bank of selecting-needles supported thereon and free to slide lengthwise to a limited extent transversely across the face of the bar, of means for imparting a four-motion movement to the needle-bar, substantially as set forth.

12. The combination with the needle-bar, the needles supported thereon and means for raising and lowering the needle-bar, of a friction-brake for controlling the movement of the bar, substantially as set forth.

13. The combination with the needle-bar, the needles supported thereon and a rocking support for the bar, of washers keyed to swing or rock with the said support and means for forcing the said washers into frictional contact with the bearing for said support to hold the rocking support against unintentional movement, substantially as set forth.

14. The combination with the needle-bar and needles supported thereon, of supporting-arms for holding the needle-bar in swinging or rocking adjustment, means for operating said arms to raise the needle-bar and needles and means for swinging or rocking the needle-bar on its support intermediate of its upward and downward movements, substantially as set forth.

15. The combination with the needle-bar and needles supported thereon, of means for swinging the bar to feed the pattern-card and means for varying the length of the swinging movement of the bar to vary the feed.

16. The combination with the swinging needle-bar and needles carried thereby, of a vibrating arm for swinging the needle-bar, an angle-lever for operating said arm, a connecting rod or link intermediate of said angle-lever and vibrating arm and means for adjusting the length of said connecting rod or link intermediate of the lever and arm to vary the swinging movement of the needle-bar, substantially as set forth.

17. The combination with the swinging needle-bar and needles carried thereby, of a vibrating arm for swinging the needle-bar, an angle-lever for operating said arm, a connecting rod or link intermediate of said angle-lever and vibrating arm and means for adjusting the said connecting-rod toward and away from the pivotal support of the vibrating arm to vary the swinging movement of the arm, substantially as set forth.

18. The combination with the swinging needle-bar and needles carried thereby, of a vibrating arm for swinging the needle-bar, an angle-lever for operating said arm, a connecting rod or link intermediate of said angle-lever and vibrating arm and means for adjusting the said connecting link or arm toward and away from the fulcrum of the angle-lever to vary the swinging movement of the needle-bar, substantially as set forth.

19. The combination with the swinging needle-bar and needles carried thereby, of a vibrating arm for swinging the needle-bar, an angle-lever for operating said arm, a connecting rod or link intermediate of said angle-lever and vibrating arm and means for adjusting the said connecting link or rod toward and away from the fulcrums of both the vibrating lever and angle-lever to vary the swinging movement of the arm, substantially as set forth.

20. The combination with the bank of selecting-needles and means for operating them and the punching mechanism, of hooks for transmitting the action of the selecting-needles to the punching mechanism, the said hooks comprising elongated shanks and heads having a dovetailed connection with the shanks, substantially as set forth.

21. The combination with the bank of selecting-needles, the punching mechanism and hooks under the control of the needles to transmit the action of the needles to the punching mechanism, of a reciprocating knife for engaging certain of the hooks and means for moving the knife simultaneously in a forward and upward direction, substantially as set forth.

22. The combination with the bank of selecting-needles, the punching mechanism and means for operating them, of transmitting-hooks having their shouldered or hooked ends extended in each of two opposite directions, reciprocating knives arranged to engage the hooks and means for raising and lowering the knives to engage either the raised or depressed hooks at pleasure, substantially as set forth.

23. The combination with a bank of selecting-needles, the card-punching mechanism and means for operating them, of hooks for transmitting the action of the needles to the punching mechanism and means for operating either those hooks which have been acted upon by the needles or those which have not been acted upon by the needles, at pleasure, substantially as set forth.

24. The combination with the bank of selecting-needles and the punching mechanism and means for operating them, of hooks under the control of the needles for transmitting their action to the punching mechanism, knives for operating the hooks, movable supports for the knives and means under the control of the operator for simultaneously raising and lowering the said knife-supports, substantially as set forth.

25. The combination with the bank of selecting-needles, the card-punching mechanism and means for operating them, of hooks under the control of the needles for transmitting their action to the punching mechanism, knives for operating the hooks, movable supports for the knives, eccentrics connected with said movable supports and means under the control of the operator for simultaneously moving the eccentrics to raise and lower the knife-supports, substantially as set forth.

26. The combination with the bank of selecting-needles, the card-punching mechanism and means for operating them, of hooks under the control of the needles for transmitting their action to the punching mechanism and hook-operating knives arranged one above and the other below the line of hooks for operating the one or the other of a set of hooks, substantially as set forth.

27. The combination with the selecting-needles, the card-punching mechanism and the hooks for transmitting the action of the selecting-needles to the card-punching mechanism of a hook-supporting bar having a rack inserted in its body for receiving the shanks of the hooks, substantially as set forth.

28. The combination with the selecting-needles, the card-punching mechanism and means for operating them, of hooks for transmitting the action of the needles to the punching mechanism, keys for controlling the cutting mechanism flexible connections between the keys and shanks of the hooks, a supporting-bar and a perforated guide-strip inserted in said supporting-bar for guiding the said flexible connections, substantially as set forth.

29. The combination with the needle-bar, the bank of selecting-needles and means for swinging the bar and for raising and lowering it and the needles thereon, of a rack located beneath the bank of needles with the spaces between its teeth located beneath the needles and a support for the rack, the rack having a dovetailed connection with the supporting-frame, substantially as set forth.

30. The combination with the bank of selecting-needles and means for swinging, raising and lowering them, of a rack located below the plane along which the pattern to be engaged by the selecting-needles is fed and means for adjusting the rack longitudinally to center the needles intermediate of its teeth, substantially as set forth.

31. The combination with the selecting and punching sections of the machine and connections for transmitting the action of the selecting mechanism to the punching mechanism, of means for adjusting the selecting-section bodily toward and away from the punching-section to vary the tension upon said connections.

32. The combination between the selecting and punching sections of the machine and the connections for transmitting the action of the selecting mechanism to the punching mechanism, of adjusting mechanism engaged with the base of the selecting-mechanism support for moving the latter bodily toward and away from the punching-section of the machine, substantially as set forth.

33. The combination with the selecting and punching sections of the machine and the connections for transmitting the action of the selecting mechanism to the punching mechanism, of a foundation on which the selecting-section is adapted to rest and an adjusting-screw arranged to move the support of the selecting mechanism bodily along the foundation to vary its position with respect to the punching mechanism, substantially as set forth.

34. The combination with the selecting and card-cutting sections of the machine and means for adjusting them toward and away from one another, of an extensible and contractible driving-shaft connecting the two sections, substantially as set forth.

35. The combination with the selecting and card-cutting sections of the machine, of a shaft-bearing carried by one of the said sections and a drive-shaft connecting the two sections and having a longitudinal sliding movement in said bearing, substantially as set forth.

36. The combination with the selecting and card-cutting sections of the machine, of a drive-shaft composed of sections having a universal-joint connection, a sleeve or tubular bearing for one of the shaft-sections, the said section having a free longitudinal sliding movement within the bearing, substantially as set forth.

37. The combination with the selecting-needles, the hooks and the punches, of the keys for controlling the punches, connections between the hooks and keys for operating them and a retarding or brake mechanism in direct engagement with the keys for holding them at the limits of their movements in opposite directions while permitting them to be positively moved, substantially as set forth.

38. The combination with the selecting-needles, the hooks, the punches, the keys and the connections between the keys and hooks, of a reciprocating plate for positively operating the hooks and hence the keys in one direction and means for positively operating the keys in the opposite direction, substantially as set forth.

In testimony that I claim the foregoing as my invention I have signed my name, in presence of two witnesses, this 10th day of September, A. D. 1901.

VERNON ROYLE.

Witnesses:
D. B. VAN BUREN,
HEBER ROYLE.